United States Patent
Stegelmann

(10) Patent No.: US 6,786,383 B2
(45) Date of Patent: Sep. 7, 2004

(54) ULTRASONIC HORN ASSEMBLY WITH FUSED STACK COMPONENTS

(75) Inventor: Norman R. Stegelmann, Appleton, WI (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 0 days.

(21) Appl. No.: 10/294,162

(22) Filed: Nov. 14, 2002

(65) Prior Publication Data

US 2004/0094603 A1 May 20, 2004

(51) Int. Cl.⁷ .............................. B23K 5/20; H01L 41/04
(52) U.S. Cl. ...................... 228/1.1; 228/4.5; 228/110.1; 310/364; 310/366; 310/367
(58) Field of Search .................. 228/4.5, 1.1, 180.5, 228/180.22, 110.1, 102, 120, 121; 219/56.21, 56.22; 310/334, 364, 366, 367, 317, 318, 348; 601/2

(56) References Cited

U.S. PATENT DOCUMENTS

| | | |
|---|---|---|
| 3,780,926 A | 12/1973 | Davis |
| 3,937,990 A | 2/1976 | Winston |
| 3,955,740 A | 5/1976 | Shoh |
| 4,063,939 A | 12/1977 | Weaver et al. |
| 4,074,152 A | 2/1978 | Asai et al. |
| 4,152,816 A | 5/1979 | Ewing et al. |
| 4,485,961 A | 12/1984 | Ekbom et al. |
| 4,582,240 A * | 4/1986 | Lux et al. .................... 228/121 |
| 5,087,320 A | 2/1992 | Neuwirth et al. |
| 5,096,532 A | 3/1992 | Neuwirth et al. |
| 5,110,403 A | 5/1992 | Ehlert |
| 5,118,982 A * | 6/1992 | Inoue et al. ................. 310/366 |
| 5,325,012 A * | 6/1994 | Sato et al. ................... 310/364 |
| 5,384,508 A | 1/1995 | Vaxelaire |
| 5,552,013 A | 9/1996 | Ehlert et al. |
| 5,562,790 A | 10/1996 | Ehlert et al. |
| 5,645,681 A | 7/1997 | Gopalakrishna et al. |
| 5,772,100 A | 6/1998 | Patrikios |
| 5,828,156 A * | 10/1998 | Roberts ....................... 310/317 |
| 5,836,897 A * | 11/1998 | Sakurai et al. ................. 601/2 |
| 5,976,316 A | 11/1999 | Mlinar et al. |
| 6,059,923 A | 5/2000 | Gopalakrishna |
| 6,150,753 A * | 11/2000 | DeCastro ..................... 310/334 |
| 6,171,265 B1 * | 1/2001 | Novak et al. ................... 601/2 |
| 2003/0155403 A1 * | 8/2003 | Haregoppa et al. ......... 228/110.1 |

FOREIGN PATENT DOCUMENTS

| | | |
|---|---|---|
| FR | 2079768 | 11/1971 |
| JP | 07/274291 | 10/1995 |

OTHER PUBLICATIONS

International Search Report from PCT/US 03/17145 dated Oct. 17, 2003.

* cited by examiner

*Primary Examiner*—L. Edmondson
(74) *Attorney, Agent, or Firm*—Senniger Powers

(57) ABSTRACT

An ultrasonic horn assembly for applying ultrasonic energy at an operating location which assembly includes a metallic fusion zone at an interface between adjacent horn assembly components. A method of manufacturing an ultrasonic horn assembly including forming this metallic fusion zone.

27 Claims, 2 Drawing Sheets

ULTRASONIC HORN ASSEMBLY WITH FUSED STACK COMPONENTS

BACKGROUND OF INVENTION

This invention relates to an ultrasonic horn assembly having one or more of its major stack components formed separately and subsequently fused together.

Ultrasonic horn assemblies are used to distribute ultrasonic energy in a variety of industrial processes. One example involves bonding of two thermoplastic sheets of material together in the manufacture of personal care products such as diapers. These assemblies have a number of distinct components, which are connected in a stack. In one arrangement these components may include a power excitation device known as a converter (or driver assembly), amplitude modification devices known as boosters, and an ultrasonically energized tool known as a horn, which contacts a work piece.

Heretofore ultrasonic horn assembly stack components have been connected to each other by use of a fully threaded, high strength steel stud. A drawback of this arrangement is that a high-pressure center contact area tends to form in the area immediately around the stud at the interface between the two stack components being connected. In particular, the clamping forces are concentrated in an area immediately around the stud. The clamping pressure at the interface holding these two components together is significantly greater immediately around the stud than it is at the periphery of the mating surfaces remote from the stud. As such, the clamping force that holds the components together degrades as one moves peripherally away from the stud. As ultrasonic energy is transmitted across this interface over time and during extended operation of the horn assembly, the variation in clamping force at the interface facilitates various wear phenomena. In particular, fretting and spalling due to friction between poorly mated assembly interfaces can occur, producing severe surface damage. And oxidation which converts titanium on the component surface to black, hard, brittle titanium oxide can occur. Fretting, spalling, and oxidation degrade the efficiency of energy transfer between the components, and require periodic disassembly to refinish the stack components at the interface therebetween. Furthermore, the interface between the components, even prior to any significant wear, is a source of energy loss during energy transfer across the interface, because any interface represents an impedance mismatch between components which expresses itself as the generation of heat.

In certain previous embodiments the interface between the primary booster and the horn is eliminated by having the primary booster manufactured integrally with the horn. A drawback of this arrangement is that the integral booster and horn is a relatively large component, the manufacture of which requires substantial machining from an especially large, more complex forging. Moreover, matching the resonant frequency of the booster to that of the horn is not possible when the horn and booster are integral.

Isolation ring shells are employed to mount ultrasonic horn assembly boosters to mounting housing for supporting the assembly in suspension. In one prior arrangement the isolation ring shell is connected to the booster using a fastening device such as a threaded stud. Wear can occur at the connection between the shell and the booster. Alternatively, isolation ring shells have been forged integrally with boosters. This, however, requires forging a relatively large complex preform requiring substantial machining. It also requires that the isolation ring shell be of the same metal as the booster, which does not permit the isolation ring shell to be manufactured from a more damping material than the booster material.

SUMMARY OF THE INVENTION

In response to the above difficulties and problems, the invention provides an ultrasonic horn assembly which has reduced maintenance requirements for stack component interfaces, which has reduced machining requirements upon manufacture, which employs components with pre-matched resonant frequencies, which has more efficient energy transfer between stack components, and which overall operates more efficiently due to matched frequencies.

Briefly, therefore, the invention is directed to an ultrasonic horn assembly for transporting ultrasonic energy to an operating location to apply the ultrasonic energy to at least one article at the operating location. The assembly has a first stack component having at least one transfer face, and a second stack component distinct from the first stack component, the second stack component having at least one transfer face adapted to engage the transfer face of the first stack component at an interface for transmitting ultrasonic energy from one of the first and second stack components to the other. There is a fusion zone at the interface integrally connecting the first and second stack components together, wherein the fusion zone comprises metallic fusion of the first stack component to the second stack component.

The invention is also directed to an ultrasonic horn assembly having a first stack component and an isolation ring shell for mounting the first component to a mounting housing and supporting the stack component in suspension, wherein the isolation ring shell is distinct from the first stack component and is connected to the first stack component at an interface. There is a fusion zone at the interface integrally connecting the isolation ring shell and the first stack component together, wherein the fusion zone comprises metallic fusion of the isolation ring shell to the first stack component.

In another aspect the invention is a method for manufacturing an ultrasonic horn assembly for transporting ultrasonic energy to an operating location to apply the ultrasonic energy to at least one article at the operating location. The method involves engaging a transfer face of a first ultrasonic horn assembly stack component with a transfer face of a second ultrasonic horn assembly stack component to define an interface between the stack components; and metallurgically fusing the transfer face of the first ultrasonic horn assembly stack component with the transfer face of a second ultrasonic horn assembly stack component to form a fusion zone at the interface between the stack components.

The invention is also directed to a method for manufacturing an ultrasonic horn assembly which method includes fitting an isolation ring shell onto a component of the ultrasonic horn assembly, which isolation ring shell is adapted for mounting the ultrasonic horn assembly component to a mounting housing and supporting the component in suspension, such that a surface of the isolation ring shell engages a surface of the component at an interface; and metallurgically fusing the isolation ring shell to the component to form a fusion zone at the interface.

Other features and advantages will be in part apparent and in part pointed out hereinafter.

DETAILED DESCRIPTION OF THE PREFERRED EMBODIMENTS

The present invention provides an ultrasonic horn assembly for any of a variety of manufacturing operations, such as for bonding at least two continuously moving substrate webs together. The assembly is particularly useful for ultrasonically bonding selected components to absorbent articles using a rotary ultrasonic horn. Alternatively, the assembly is useful for bonding two webs together to form a composite material and subsequently using it as a component in an absorbent article such as, for example, a disposable diaper.

The present invention is particularly useful in the bonding of two or more layers of materials which preferably are made, at least in part, from thermoplastic polymers. In particular, the assembly can be used to ultrasonically bond stretchable outer ears to a disposable diaper using a rotary ultrasonic horn. The stretchable outer ears enhance the fit of the diaper about the waist of the wearer. The assembly may also be used to bond a fastening system to the outer ears of the diaper. In addition, it should be readily understood that the assembly may be used in the manufacture of other types of articles, such as, for example, training pants, feminine care products, incontinence garments, hospital gowns, and the like. All of such alternative configurations are contemplated as being within the scope of the present invention. The present invention may also be employed with, for example, a rotary ultrasonic horn configured to selectively perforate a material, or to selectively cut shapes from the material.

Figure 1:
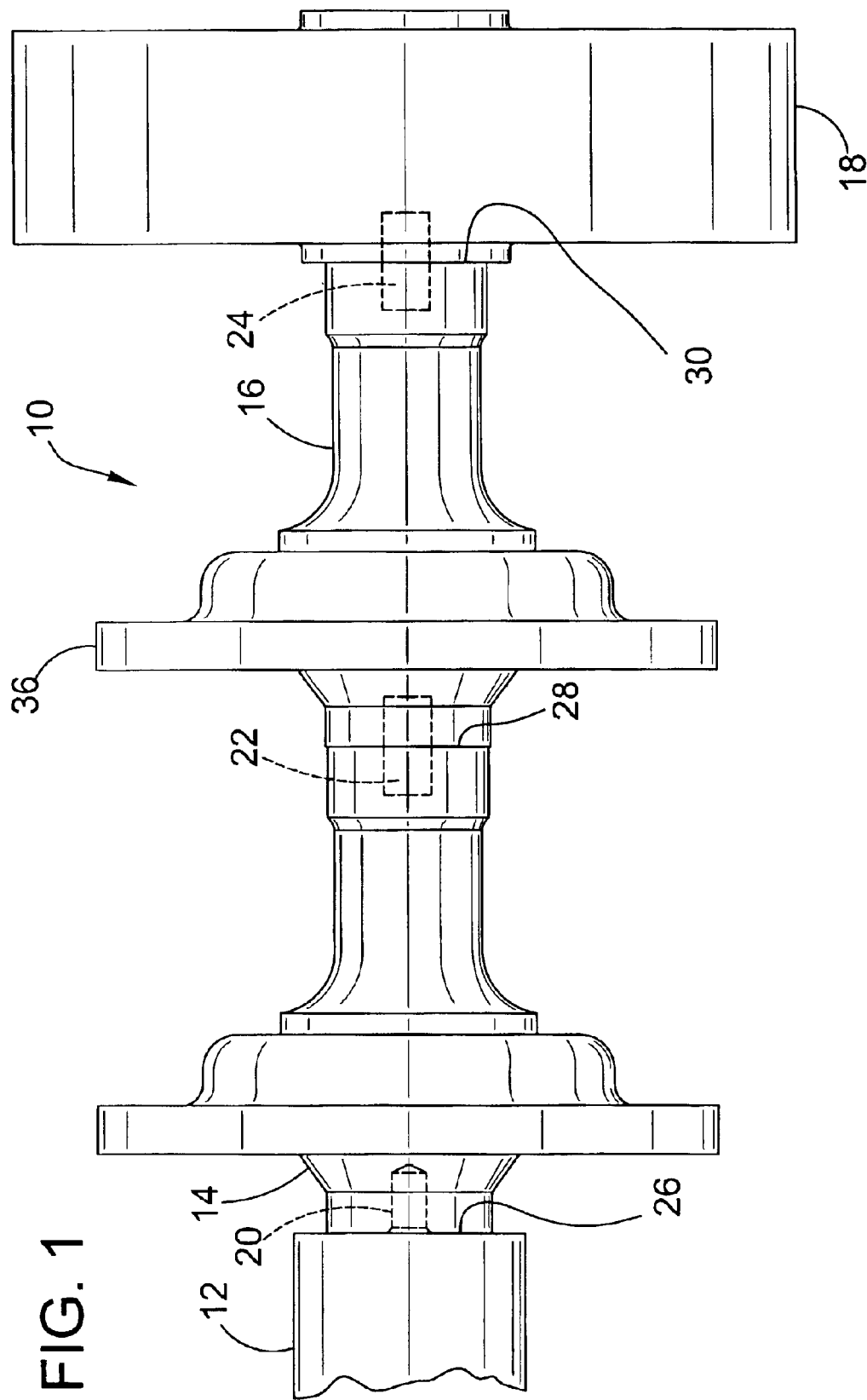
FIG. 1 is a schematic representation of an ultrasonic horn assembly of the invention.
Figure 2:
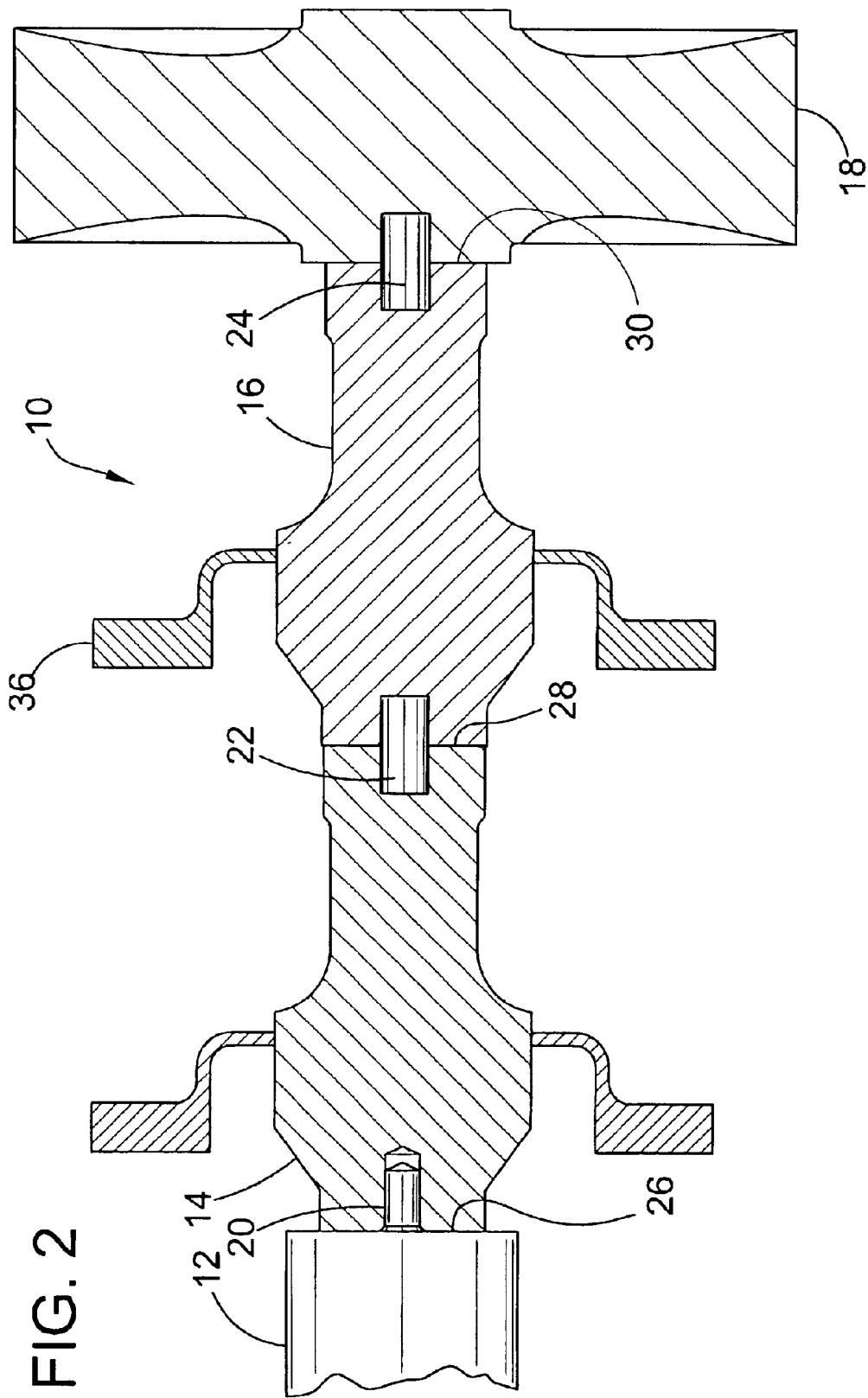
FIG. 2 is a schematic representation of an ultrasonic horn assembly of FIG. 1 in partial cross section.

FIGS. 1 and 2 schematically illustrate an ultrasonic horn assembly 10 having a number of stack components including a converter 12, a secondary booster 14, a primary booster 16, and a horn 18. Alternatively, the assembly may employ, no boosters, one booster, or more than two boosters. Connectors 20, 22, and 24 connect the various stack components at interfaces 26, 28, and 30.

In general, the ultrasonic horn 18 may be made from any metal having suitable acoustical and mechanical properties. Suitable metals include aluminum, monel, titanium and some alloy steels. In general, variables such as the diameter, mass, width, thickness and configuration of the ultrasonic horn 18 are not critical. However, the variables do determine the particular frequency and amplitude at which the ultrasonic horn resonates and vibrates.

The ultrasonic horn 18 is intended to be excited at a frequency of from about 15 to about 60 kHz. One specific embodiment is designed for operation at 20 kHz. The horn may have, for example, a diameter of from about 4 to about 20 centimeters and a width at the bonding surface of from about 0.6 to about 13 centimeters. The thickness of the horn at the rotational axis may be from about 0.06 to about 15 centimeters. The horn may have a mass in the range of from about 0.06 to about 30 kilograms. The diameter, width, and thickness of the horn are selected such that the horn, upon being excited by ultrasonic energy at a desired frequency, is adapted to resonate such that the excited end moves substantially in phase with the movement of the source of excitation and the opposed end and bonding surface move substantially out of phase with the excited end. Thus, upon subjecting the horn to ultrasonic excitation, the excited end moves in a direction towards the interior of the horn while the opposing end and the bonding surface move in the opposite direction which is also towards the interior of the horn. As such, the movements of the ends of the horn relative to each other are said to be out of phase. Ultrasonic energy is delivered to an operating location, which is at the energy transfer surface on the periphery of the horn which acts in conjunction with the anvil to perform work on the work piece.

The ultrasonic horn assembly 10 also includes a drive mechanism or converter 12 to ultrasonically excite the ultrasonic horn 18. Any mechanism which provides the desired excitation can be used in the present invention. Such mechanisms are well known to those skilled in the art. For example, the assembly may include a drive mechanism that is commercially available from Dukane Corporation located in St. Charles, Ill. or a similar system available from Branson Sonic Power Company located in Danbury, Conn. Typically, a generator, such as a Dukane 3000 watt, 20 kHz generator (Part No. 20A3005), is connected to a driver assembly, such as a Dukane driver assembly (Part No. 110-3716-0001), to provide the necessary ultrasonic excitation. Any combination of boosters 14 and 16, such as a Dukane 1:1 booster (Part No. 110-2510) and a Dukane 1.5:1 booster (Part No. 110-2512), may then be attached to the driver assembly. Finally, the rotary ultrasonic horn is attached to the boosters. Thus, the combination of the generator, drive assembly and boosters ultrasonically excites the ultrasonic horn 18 thereby providing the ultrasonic energy necessary to bond the substrate webs together, perforate a substrate, or otherwise carry out the desired operation.

The components include transfer faces for transmitting energy. A transfer face is a surface at the end of a component and is the surface through which ultrasonic energy is transferred to an adjoining component. For example, horn 18 has a transfer face at interface 30 which engages a transfer face of booster 16 at interface 30. Ultrasonic energy is transferred from the booster to the horn across these transfer faces.

The assembly also includes an anvil (not shown) with which the horn acts, with the work piece therebetween. The anvil may be a stationary anvil, or may optionally be a rotating anvil roll as in the case of a rotating ultrasonic horn as described in U.S. Pat. Nos. 5,087,320, 5,096,532, 5,110,403, and 5,552,013 (all hereby incorporated by reference). The rotating anvil roll has an outer peripheral anvil surface located adjacent the energy transfer surface of the horn 18. The anvil roll is configured to rotate about an anvil axis in a direction such that its bonding surface moves in the direction in which the work piece travels. In one specific bonding operation, substrate webs continuously move between the energy transfer face of the horn and the anvil.

Upon energization the ultrasonic horn cyclically expands and contracts, which expansion and contraction is the driving force for the bonding or other mechanical operation performed by the horn. For example, the horn expands and contracts a total amplitude of about 0.003 inches (0.0075 cms) at a frequency of 20,000 cycles per second. This translates to a total movement of about 120 inches (300 cms) of movement per second. This movement corresponds to an energy value applied to the work piece traveling between the horn's energy transfer surface and the anvil. Some of the energy is simply returned as elastic reaction, and most of the energy is dissipated as heat, which heats or melts two plastic materials being processed.

The invention applies to any other type of ultrasonic equipment having joined components. One such alternative ultrasonic assembly to which the invention applies is a plunge-type ultrasonic system. In this type of system, there is a stationary anvil with a working surface, and an opposed working surface on an ultrasonic horn. Ultrasonic energy is transmitted by the horn in a direction perpendicular to the plane defined by the working surface of the anvil, thereby bringing the working surface of the horn into vibratory proximity with the working surface of the anvil. The work piece to be bonded, perforated, or otherwise worked upon is positioned between the respective working surfaces.

The interface 26 in FIGS. 1 and 2 is the location of engagement of the energy transfer face of the converter 12 to the energy transfer face of the secondary booster 14. The interface 28 is the location of engagement of the transfer face of the secondary booster 14 to the energy transfer face of the primary booster 16. The interface 30 is the location of engagement of the energy transfer face of the primary booster 16 to the energy transfer face of the horn 18.

The transfer faces are lapped to be flat to within two millionths of an inch and thoroughly cleaned with acetone prior to assembly. Connectors between the respective components can be employed to bring the transfer faces into alignment and intimate contact with each other prior to the fusion operation. With specific regard to the connectors, connector 22, for example, may be in one embodiment a solid pin having a clearance of 0.001 inch or less to provide an interference fit between the components. In another embodiment, the connectors may be partially or fully threaded studs passing through the interfaces. Threaded studs are less preferred because the threads correspond to greater surface area and therefore greater potential for imperfect fusion or other flaws. Moreover, inasmuch as joining is accomplished by fusion, as described more fully below, the clamping forces threads would provide are unnecessary, so the extra machining effort and expense of threading studs and threading holes in the components can be avoided. The connectors of any type may be formed from the same alloy as the stack components, such as a titanium-based material, such commercially pure titanium or a titanium alloy (e.g., Ti6Al4V).

The invention employs a fusion zone comprising metallic fusion of the respective components at these interfaces. This fusion zone facilitates more efficient ultrasonic energy transfer between the respective components because it serves to integrate the components to each other, thus eliminating loss of energy between the components at the transfer interface. Moreover, the fusion zone eliminates the need for periodic disassembly to remove wear and oxide on the respective transfer faces.

The fusion zones are formed at the interfaces by metallic fusion between the energy transfer faces. In one preferred embodiment, hot isostatic pressing forms these fusion zones. The respective components are mechanically connected to each other with connectors as described above, and then the components with transfer faces in engagement are subjected to hot isostatic pressing. This is achieved in a single pressing operation for the entire assembly.

The hot isostatic pressing operation can be carried out employing a pressure vessel which can be pressurized employing a gas, such as argon, of commercial quality to apply a pressure equally over the entire surface area of the assembly. The pressure, in combination with the elevated temperature employed, effects a 100% fusion bonding across the interfaces causing them to become totally integrated to an interface density approaching 100 percent theoretical density. A pressure suitable for use in this operation range can be, for example, about 16 ksi. The temperature employed in this operation can be in the range of about 1500 F. (about 815 C.) to about 1600 F. (about 870 C.). The duration of the hot isostatic pressing step depends upon the temperature and pressure selected. As a general proposition, when the pressure is 16 ksi and the temperature is in the range of about 1500 F. (about 815 C.) to about 1600 F. (about 870 C.), the process may employ a time period of about 1.5 hrs to about 3 hrs, for example 2 hrs, in one embodiment. At the conclusion of the hot isostatic pressing step, the assembly is cooled and removed from the pressure vessel.

During the hot isostatic pressing step a high-strength uniform metallurgical diffusion bond is formed between the transfer faces. The invention, therefore, includes a manufacturing method involving engaging a transfer face of a first ultrasonic horn assembly stack component with a transfer face of a second ultrasonic horn assembly stack component to define an interface between the stack components, and metallurgically fusing these transfer faces to form a fusion zone at the interface between the stack components. The resultant metallic fusion formed is characterized as not appreciably indicating a line of demarcation between the components, but rather a uniform transformation of grain structure characteristic of an integral assembly. In one embodiment the fusion zone can extend from on the order of 0.001 inch (0.0025 cm) into each component to on the order of several thousands of an inch, such as 0.005 inch (0.0075 cm) into each component, for a total fusion zone width of between about 0.002 inch (0.005 cm) and about 0.01 inch (0.025 cm). In other embodiments the fusion zone may be wider or narrower.

To prepare the connected components for the fusion procedure such as hot isostatic pressing, it is first desirable, but not required, to subject seams at the interfaces to a preliminary sealing operation to bring the transfer faces into more intimate contact and to seal the interfaces from external air or atmosphere during hot isostatic pressing. In one embodiment, this is accomplished by electron beam welding as is well understood in the metals joining art, involving a vacuum process to remove any residual air from between the components at their interface, followed by electron beam welding to seal the hairline interface along the exposed outside of the interfaces 26, 28, 30, and 38. By sealing this interface under vacuum conditions, all air or atmosphere is prevented from interfering with subsequent fusion by hot isostatic pressing.

Heretofore one approach to eliminating maintenance requirements and energy loss between the primary booster and the horn has been to manufacture these two components integrally in a single manufacturing operation. This required a relatively large preform, and excessive machining. With the integral fusion bond between the booster and the horn of the present invention, the primary booster can be preferably manufactured separately from manufacture of the horn. In this regard the invention employs stack components which are distinct from each other, that is, manufactured separately. This reduces the size of the necessary preform and reduces machining in comparison to the situation where the booster and horn are manufactured together, without having to sacrifice energy transfer efficiency, and without subjecting the overall assembly to the periodic maintenance at the booster-horn interface. Moreover, the booster resonant frequency can be precisely tuned to match the resonant frequency of the horn prior to attachment of the booster to the horn. This pre-matching improves energy transfer efficiency and ultrasonic energy output capacity, because the successive components resonate in concert. This tuning can be accomplished by forming the boosters initially to be longer than the required length, then machining material off of the output end until the booster resonant frequency matches the horn resonant frequency.

Isolation ring shells 36 are employed to mount the boosters to a mounting housing (not shown) for supporting the assembly in suspension. An isolation ring shell can be connected to the booster in much the same way as described above in which the boosters are connected to each other, the primary booster to the horn, and the converter to the secondary booster. One can optionally use a connecting pin, but a connecting pin is required because the fact that the ring surrounds the booster holds it in place, thus eliminating the need for a connecting pin. In particular, the isolation ring shells can be aligned with, and press-fit onto, the boosters, then subjected to fusion bonding such as hot isostatic pressing under the aforementioned conditions. A significant advantage of this means of integral connection is that it permits manufacture of the isolation rings separately from manufacture of the boosters. This significantly reduces the size of preforms required to form the components, resulting in less machining and less scrapping of expensive removed metal. It permits greater flexibility in geometric shape for the ring shells.

Forming the isolation ring shells separately from forming the boosters also permits manufacturing the isolation ring shells from a different, more ultrasonically damping material. For example, the booster may be manufactured from a non-iron-based material, such as a titanium-based material, such as commercially pure titanium or a titanium alloy (e.g, Ti6Al4V); and the isolation ring from a non-titanium based material, such as an iron-based material such as mild steel or ductile iron. For example, while the booster is formed from Ti6Al4V in a preferred embodiment, the isolation ring shells can be formed from mild steel or ductile iron. The quality of damping is the quality a material has of dissipating acoustic energy as heat rather than transmitting as vibrational acoustic energy. This advantageously provides greater acoustic isolation decoupling between the booster and the mounting apparatus than with the situation where the ring is titanium.

The foregoing features of the invention eliminate generation of excess heat at the interfaces, and appear to correspond to a slight increase in horn output amplitude. Fretting and spalling, which are the severe surface damage phenomena due to friction between poorly mated assembly interfaces, are eliminated by this arrangement. Oxidation, the high temperature phenomenon which converts titanium on the component surface to black, hard, brittle titanium oxide which interferes with energy transfer, is also eliminated.

As various changes could be made in the above-described horn assembly without departing from the scope of the invention, it is intended that all matter contained in the above description be interpreted as illustrative and not in a limiting sense.

What is claimed is:

1. An ultrasonic horn assembly for transporting ultrasonic energy to an operating location to apply the ultrasonic energy to at least one article at the operating location, the horn assembly comprising:

a first stack component having at least one transfer face, wherein the first stack component is metal and is selected from the group consisting of an ultrasonic horn, an ultrasonic energy booster, and an ultrasonic energy converter;

a second stack component having at least one transfer fate adapted to engage the transfer face of the first stack component at an interface for transmitting ultrasonic energy from one of the first and second stack components to the other, wherein the second stack component is metal and is selected from the group consisting of an ultrasonic horn, an ultrasonic energy booster, and an ultrasonic energy converter, and wherein the first and second stack components are not the same component; and a fusion zone at the interface integrally connecting the first and second stack components together, wherein the fusion zone comprises metallic fusion of the first stack component to the second stack component.

2. An ultrasonic horn assembly for transporting ultrasonic energy to an operating location to apply the ultrasonic energy to at least one article at the operating location, the horn assembly comprising a first stack component having at least one transfer face, wherein the first stack component is metal;

a second stack component distinct from the first stack component, the second stack component having at least one transfer face adapted to engage the transfer face of the first stack component at an interface for transmitting ultrasonic energy from one of the first and second stack components to the other, wherein the second stack component is metal;

a fusion zone at the interface integrally connecting the first and second stack components together, wherein the fusion zone comprises metallic fusion of the first stack component to the second stack component; and a connector adapted to connect the first and second stack components together with their transfer faces in engagement, the connector extending through the fusion zone.

3. The ultrasonic horn assembly of claim 1 further comprising a solid pin adapted to connect the first and second stack components together by interference fit with their transfer faces in engagement, the pin extending through the fusion zone at the interface.

4. An ultrasonic horn assembly for transporting ultrasonic energy to an operating location to apply the ultrasonic energy to at least one article at the operating location, the horn assembly comprising a first stack component having at least one transfer face, wherein the first stack component is metal;

a second stack component distinct from the first stack component, the second stack component having at least one transfer face adapted to engage the transfer face of the first stack component at an interface for transmitting ultrasonic energy from one of the first and second stack components to the other, wherein the second stack component is metal;

a fusion zone at the interface integrally connecting the first and second stack components together, wherein the fusion zone comprises metallic fusion of the first stack component to the second stack component; and wherein the first stack component is an ultrasonic horn and the second stack component in an ultrasonic energy booster.

5. The ultrasonic horn assembly of claim 4 comprising a connector adapted to connect the first and second stack components together with their transfer faces in engagement, the connector extending through the fusion zone.

6. The ultrasonic horn assembly of claim 4 comprising a solid pin adapted to connect the first and second stack components together by interference fit with their transfer faces in engagement, the pin extending through the fusion zone at the interface.

7. The ultrasonic horn assembly of claim 1 wherein the first stack component is an ultrasonic energy booster and the second stack component is an ultrasonic energy converter.

8. The ultrasonic horn assembly of claim 7 comprising a solid pin adapted to connect the first and second stack components together by interference fit with their transfer faces in engagement, the pin extending through the fusion zone at the interface.

9. The ultrasonic horn assembly of claim 7 comprising a connector adapted to connect the first and second stack components together with their transfer faces in engagement, the connector extending through the fusion zone.

10. An ultrasonic horn assembly for transporting ultrasonic energy to an operating location to apply the ultrasonic energy to at least one article at the operating location, the horn assembly comprising:

a first stack component selected from the group consisting of an ultrasonic energy booster and an ultrasonic energy converter, wherein the first stack component is metal;

an isolation ring shell for mounting the first component to a mounting housing and supporting the stack component in suspension, wherein the isolation ring shell is distinct from the first stack component and is connected to the first stack component at an interface; and a fusion zone at the interface integrally connecting the isolation ring shell and the first stack component together, wherein the fusion zone comprises metallic fusion of the isolation ring shell to the first stack component.

11. The ultrasonic horn assembly of claim 10 wherein the first stack component is an ultrasonic energy booster.

12. The ultrasonic horn assembly of claim 10 wherein the isolation ring shell and first stack component are manufactured from different materials.

13. The ultrasonic horn assembly of claim 10 wherein the first stack component is manufactured from a titanium-based material and the isolation ring shell is manufactured from a non-titanium-based material.

14. The ultrasonic horn assembly of claim 10 wherein the isolation ring shell is manufactured from an iron-based material and the first stack component is manufactured from a non-iron-based material.

15. The ultrasonic horn assembly of claim 10 wherein the isolation ring shell is manufactured from an iron-based material and the first stack component is manufactured from a titanium-based material.

16. A method for manufacturing an ultrasonic horn assembly for transporting ultrasonic energy to an operating location to apply the ultrasonic energy to at least one article at the operating location, the method comprising:

engaging a transfer face of a first stack component with a transfer face of a second stack component to define an interface between the stack components, wherein the first and second stack components are metal and are selected from the group consisting of an ultrasonic horn, an ultrasonic energy booster, and an ultrasonic energy converter, and wherein the first and second stack components are not the same component; and metallurgically fusing the transfer face of the first stack component with the transfer face of a second stack component to form a fusion zone at the interface between the stack components.

17. The method of claim 16 wherein the first stack component is an ultrasonic energy converter and the second stack component is an ultrasonic energy booster.

18. The method of claim 16 wherein the first stack component is an ultrasonic energy booster and the second stack component is an ultrasonic horn.

19. The method of claim 16 wherein the first stack component is an ultrasonic energy booster and the second stack component is an isolation ring shell.

20. A method for manufacturing an ultrasonic horn assemble for transporting ultrasonic energy to an operating location to apply the ultrasonic energy to at least one article at the operating location, the method comprising:

engaging a transfer face of a first stack component with a transfer face of a second stack component to define an interface between the stack components; and metallurguically fusing the transfer face of the first stack component with the transfer face of a second stack component to form a fusion zone at the interface between the stack components, wherein the metallurgically fusing comprises hot isostatic pressing.

21. The method of claim 20 wherein the first stack component is an ultrasonic energy converter and the second stack component is an ultrasonic energy booster.

22. The method of claim 20 wherein the first stack component is an ultrasonic energy booster and the second stack component is an ultrasonic energy booster.

23. The method of claim 20 wherein the first stack component is an ultrasonic energy booster and the second stack component is an ultrasonic horn.

24. The method of claim 20 wherein the first stack component is an ultrasonic energy booster and the second stack component is an isolation ring shell.

25. A method for manufacturing an ultrasonic horn assembly for transporting ultrasonic energy to an operating location to apply the ultrasonic energy to at least one article at the operating location, the method comprising:

fitting an isolation ring shell onto a component of the ultrasonic horn assembly, which isolation ring shell is adapted for mounting the ultrasonic horn assembly component to a mounting housing and supporting the component in suspension, such that a surface of the isolation ring shell engages a surface of the component at an interface, wherein the ultrasonic horn assembly component is metal and is selected from the group consisting of an ultrasonic energy booster and an ultrasonic energy converter; and metallurgically fusing the isolation ring shell to the component to form a fusion zone at the interface.

26. The method of claim 25 wherein the ultrasonic horn assembly component is an ultrasonic energy booster.

27. The ultrasonic horn assembly of claim 4 further comprising an anvil, wherein the ultrasonic horn assembly is capable of bonding two or more thermoplastic polymers between the transfer face of the first or second stack component and the anvil.

* * * * *